United States Patent
Rosenblatt et al.

(10) Patent No.: US 10,440,244 B2
(45) Date of Patent: Oct. 8, 2019

(54) NEAR-FIELD IMAGING DEVICES

(71) Applicant: TECHNION RESEARCH & DEVELOPMENT FOUNDATION LIMITED, Haifa (IL)

(72) Inventors: Gilad Rosenblatt, Petah-Tikva (IL); Meir Orenstein, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 309 days.

(21) Appl. No.: 15/313,954

(22) PCT Filed: May 26, 2015

(86) PCT No.: PCT/IL2015/050544
§ 371 (c)(1),
(2) Date: Nov. 24, 2016

(87) PCT Pub. No.: WO2015/181818
PCT Pub. Date: Dec. 3, 2015

(65) Prior Publication Data
US 2017/0201658 A1    Jul. 13, 2017

Related U.S. Application Data

(60) Provisional application No. 62/003,112, filed on May 27, 2014.

(51) Int. Cl.
*H04N 5/225* (2006.01)
*G02B 1/00* (2006.01)
*H04N 5/374* (2011.01)
*H04N 5/376* (2011.01)
*H04N 5/378* (2011.01)

(52) U.S. Cl.
CPC .......... *H04N 5/2254* (2013.01); *G02B 1/007* (2013.01); *H04N 5/374* (2013.01); *H04N 5/376* (2013.01); *H04N 5/378* (2013.01)

(58) Field of Classification Search
CPC ...... H04N 5/2254; H04N 5/374; H04N 5/376; H04N 5/378; G02B 1/007
See application file for complete search history.

(56) References Cited

U.S. PATENT DOCUMENTS

| 7,928,900 B2 * | 4/2011 | Fuller .................. G01S 7/414 342/175 |
| 8,094,378 B2 | 1/2012 | Kildishev et al. |
| 8,599,489 B2 | 12/2013 | Shalaev et al. |

(Continued)

OTHER PUBLICATIONS

Rosenblatt et al., "Single DNG Interface Makes a Better Perfect Lens", 9 pages, Jan. 1, 2013.

(Continued)

*Primary Examiner* — Georgia Y Epps
*Assistant Examiner* — Don J Williams
(74) *Attorney, Agent, or Firm* — Kligler & Associates

(57) ABSTRACT

Imaging apparatus (26) includes an image sensor (30), configured to capture an image of radiation at a target wavelength that is incident on a front surface of the image sensor. A metasurface (28) having a negative permittivity and a negative permeability at the target wavelength is fixed to the front surface of the image sensor.

31 Claims, 3 Drawing Sheets

(56) References Cited

U.S. PATENT DOCUMENTS

2011/0321204 A1* 12/2011 Karaki .................. B82Y 20/00
850/32
2013/0154152 A1 6/2013 Petrzelka

OTHER PUBLICATIONS

Rosenblatt et al., "A New Robust Perfect Lens", 2014 IEEE Photonics Conference (IPC), pp. 328-329, Oct. 12-16, 2014.
Rosenblatt et al.,"Perfect Lensing with Lossy Metamaterials: Maintaining a Singular Focus by Avoiding Feedback", 2016 Progress in Electromagnetic Research Symposium (PIERS), Shanghai, China, p. 4946, Aug. 8-11, 2016.
Rosenblatt et al., "Focusing Light onto a Zero-dimensional Point with Lossy Left-handed Materials", 2016 Conference on Lasers and Electro-Optics (CLEO), paper FTh4D.6., 2 pages, Jun. 5-10, 2016.
Rosenblatt et al., "Single DNG Interface Makes Perfect Imaging", Frontiers in Optics/Laser Science, paper FTh3A.4., 2 pages, year 2013.
Rosenblatt et al.,"Feedback as the source of imperfection in lossy perfect lenses", Physical Review A 93, pp. 021804-1-021804-6, year 2016.
Rosenblatt et al., "Perfect Lensing by a Single Interface: Defying Loss and Bandwidth Limitations of Metamaterials", Physical Review Letters, issue 115, pp. 195504-1-195504-6, Nov. 6, 2015.
Rosenblatt et al., "Perfect Lensing with Lossy Metamaterials: A Blueprint for Realization", 2016 IEEE Photonics conference (IPC), 2 pages, Oct. 2-6, 2016.
Rosenblatt et al., "Flat Dispersion Eigenmode Drives Perfect Imaging in DNG Slab", Progress in Electromagnetics Research Symposium, paper FRl4f.25, Taipei, Taiwan, 1 page, Mar. 25-28, 2013.
International Application # PCT/IL2015/050544 Search Report dated Sep. 16, 2015.
Burgos et al., "A single-layer wide-angle negative-index metamaterial at visible frequencies," Nature Materials 9 , pp. 407-412, May 2010.
Valentine et al., "Three-dimensional optical metamaterial with a negative refractive index", vol. 455 ,pp. 376-379, Sep. 18, 2008.
Collin et al., "Frequency dispersion limits resolution in Veselago lens," Progress in Electromagnetics Research B, vol. 19, pp. 233-261, 2010.
Pendry, J.B., "Negative Refraction Makes a Perfect Lens", Physical Review Letters, vol. 85, No. 18, pp. 3966-3969, Oct. 30, 2000.
Merlin, R., "Analytical solution of the almost-perfect-lens problem", Applied Physical Letters, vol. 84, No. 8, pp. 1290-1292, Feb. 23, 2004.
Atwater et al., "Plasmonics for improved photovoltaic devices", Nature Materials, issue 9, pp. 205-213, Mar. 2010.
Kildishev et al., "Planar Photonics with Metasurfaces", Science, vol. 339, issue 6125, pp. 1232009-1-1232009-6, Mar. 15, 2013.
Burresi et al., "Negative-Index Metamaterials: Looking into the Unit Cell", Nano Letters, vol. 10, pp. 2480-2483, Jun. 2, 2010.
Soukoulis et al., "Optical Metamaterials—More Bulky and Less Lossy", Science, vol. 330, pp. 1633-1634, Dec. 17, 2010.
Holloway et al., "An Overview of the Theory and Applications of Metasurfaces: The Two-Dimensional Equivalents of Metamaterials", IEEE Antennas and Propagation Magazine, vol. 54, No. 2, pp. 10-35, Apr. 2012.
Merlin, R., "Radiationless Electromagnetic Interference: Evanescent-Field Lenses and Perfect Focusing", Science, vol. 317, pp. 927-929, Aug. 17, 2007.
Dolling et al., "Low-loss negative-index metamaterial at telecommunication wavelengths", Optics Letters, vol. 31, No. 12, pp. 1800-1802, Jun. 15, 2006.
Dolling et al., "Negative-index metamaterial at 780 nm wavelength", Optics Letters, vol. 32, No. 01, pp. 53-55, Jan. 1, 2007.
Zhang et al., "Negative Refractive Index in Chiral Metamaterials", Physical Review Letters, vol. 102, pp. 023901-1-023901-4, Jan. 16, 2009.
Shelby et al., "Experimental Verification of a Negative Index of Refraction", Science, vol. 292, pp. 77-79, Apr. 6, 2001.
Klar et al., "Negative-Index Metamaterials: Going Optical", IEEE Journal of Selected Topics in Quantum Electronics, vol. 12, issue 6, 11 pages, Nov.-Dec. 2006.

* cited by examiner

NEAR-FIELD IMAGING DEVICES

FIELD OF THE INVENTION

The present invention relates generally to apparatus and methods for imaging, and specifically to imaging using negative-index materials.

BACKGROUND

Metamaterials are materials with artificial electromagnetic properties defined by the sub-wavelength physical structure of the materials, rather than their chemical composition. Metasurfaces are a category of metamaterials that comprise a two-dimensional pattern of repeating structures, having dimensions (pitch and thickness) less than the target wavelength of the radiation with which the metasurface is designed to interact.

Double-negative (DNG) metamaterials have attracted much research interest in recent years, although practical applications of such metamaterials are yet to develop. A DNG metamaterial has both negative electrical permittivity ($\varepsilon$) and negative magnetic permeability ($\mu$) in a wavelength range of interest. Such metamaterials exhibit negative refractive index (n), resulting in negative refraction and backward phase propagation. Designs of DNG metamaterials for use in the optical range have been described, for example, by Burgos et al., in "A single-layer wide-angle negative-index metamaterial at visible frequencies," *Nature Materials* 9 (May, 2010), pages 407-412; and by Valentine et al., in "Three-dimensional optical metamaterial with a negative refractive index," *Nature* 455 (Sep. 18, 2008), pages 376-380. Both of these publications are incorporated herein by reference. The terms "optical" and "light," as used in the context of the present patent application and in the claims, refer to electromagnetic radiation in any of the visible, infrared and ultraviolet ranges.

Lenses made from conventional materials, having a positive index of refraction, are limited in their resolution by the well-known Abbe diffraction limit, and thus cannot resolve structures of dimensions less than about half the imaging wavelength. In other words, the finest dimensions that can be resolved using visible light imaging, for example, are on the order of 0.25 $\mu$m. On the other hand, researchers have recognized that the properties of DNG metamaterials can be used, at least in theory, to produce perfect lenses, i.e., slab lenses that create an image of an object with essentially unlimited resolution. The resolution of the DNG lens may be reduced substantially, however, if the slab material is lossy (i.e., if it absorbs or scatters the radiation that it is intended to focus), as explained, for example, by Collin in "Frequency dispersion limits resolution in Veselago lens," *Progress in Electromagnetics Research B* 19 (2010), pages 233-261; and by Smith, et al., in "Limitations on subdiffraction imaging with a negative refractive index slab," *Applied Physics Letters* 82 (2003).

Optical devices based on metamaterials have been described in the patent literature. For example, U.S. Pat. No. 8,094,378, to Kildishev et al., describes a design method for structures for controlling the flow of electromagnetic energy at a sub-wavelength scale. Plane waves incident at a first surface of a planar lens of this type are said to be focused to a spot size substantially smaller than a wavelength, so as to interact with objects at the focal point, or be re-radiated. As another example, U.S. Pat. No. 8,599,489, to Shalaev et al., describes a "tunable super-lens" (TSL) for nanoscale optical sensing and imaging of bio-molecules and nano-manufacturing. The TSL utilizes negative-index materials that operate in the visible or near-infrared range. Additional patents in this field include EP2269110, WO2010144170, and U.S. Pat. No. 8,180,213.

SUMMARY

Embodiments of the present invention provide apparatus and methods for imaging using metamaterials.

There is therefore provided, in accordance with an embodiment of the present invention, imaging apparatus, which includes an image sensor, configured to capture an image of radiation at a target wavelength that is incident on a front surface of the image sensor. A metasurface fixed to the front surface of the image sensor has a negative permittivity and a negative permeability at the target wavelength.

In some embodiments, the image sensor includes an array of sensing elements. Typically, the image sensor includes a substrate, and the array of sensing elements and the metasurface may be formed as successive layers on the substrate by a microfabrication process.

Typically, the metasurface has a given thickness and is configured to form on the image sensor an image of an external focal plane at a distance from the metasurface that is equal to the thickness. In a disclosed embodiment, the image sensor is configured to capture the image of a sample at the external focal plane, and the apparatus includes a motion assembly, which is configured to adjust a position of the focal plane on the sample.

In some embodiments, the metasurface is configured to form on the image sensor an image of an external focal plane without any other element between the external focal plane and the metasurface. The metasurface is typically configured to form the image with a resolution that is finer than the diffraction limit at the target wavelength.

There is also provided, in accordance with an embodiment of the present invention, imaging apparatus, which includes an image generator, which has a front surface and is configured to generate patterned radiation at a target wavelength at the front surface. A metasurface fixed to the front surface of the image generator has a negative permittivity and a negative permeability at the target wavelength.

In one embodiment, the image generator includes an array of radiation emitters.

In another embodiment, the image generator includes a mask in which a pattern is formed, and a radiation source configured to back-illuminate the pattern.

In the disclosed embodiments, the metasurface has a given thickness and is configured to form an image of the patterned radiation at an external focal plane at a distance from the metasurface that is equal to the thickness. The apparatus may include a motion assembly, which is configured to adjust a position of the focal plane on a substrate so that the patterned radiation writes a pattern on the substrate.

Typically, the metasurface is configured to form an image of the patterned radiation on a substrate at an external focal plane without any other element between the metasurface and the substrate. The metasurface may form the image with a resolution that is finer than the diffraction limit at the target wavelength.

There is additionally provided, in accordance with an embodiment of the present invention, a method for imaging, which includes fixing a metasurface, having a negative permittivity and a negative permeability at a target wavelength, to a front surface of an image sensor. Using the metasurface, radiation at the target wavelength is focused from an object onto the image sensor so as to capture an image of the object.

The object may include, for example, a patterned semiconductor wafer or a living biological sample.

There is further provided, in accordance with an embodiment of the present invention, a method for imaging, which includes fixing a metasurface, having a negative permittivity and a negative permeability at a target wavelength, to a front surface of an image generator. Using the metasurface, patterned radiation at the target wavelength is focused from the image generator onto an object.

In some embodiments, focusing the patterned radiation includes writing a pattern on the object using the patterned radiation. In one embodiment, the object includes a semiconductor substrate, and writing the pattern includes forming the pattern on the semiconductor substrate by photolithography.

The present invention will be more fully understood from the following detailed description of the embodiments thereof, taken together with the drawings in which:

DETAILED DESCRIPTION OF EMBODIMENTS

Overview

Figure 1:
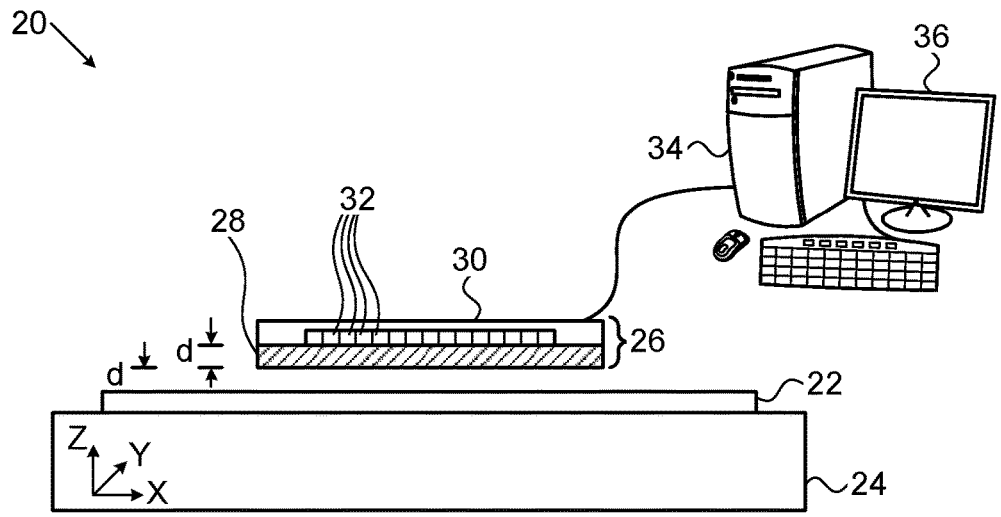
FIG. 1 is a schematic side view of an imaging system, in accordance with an embodiment of the present invention.

As noted earlier, researchers have found that losses in the negative-index metamaterial of a slab lens degrades the resolution of the lens substantially—thus negating the expected benefit of such metamaterials. Such loss, unfortunately, is intrinsic to known negative-index media due to the high dispersion of the media. The inventors have identified a possible reason for this phenomenon: In a slab configuration, coupling between the front and rear interfaces of the lens may give rise to parasitic modes in the slab, which—when media loss is present—interfere with the operation of the mode that actually facilitates perfect transmission. As a result of the degradation of resolution, the slab acts as a spatial low-pass filter and cannot resolve features smaller than a certain size. In any event, regardless of the actual scientific reason for the loss of resolution in negative-index slab lenses, a solution to this problem is needed in order to produce negative-index optics with high resolution.

Embodiments of the present invention that are described herein, therefore, use a different imaging configuration, which is able to sustain essentially perfect performance even in the presence of realistic degrees of media loss, i.e., performance that is not limited by the illumination wavelength, provided appropriate detection elements are used. In the disclosed embodiments, a DNG metasurface images an external focal plane, located in a dielectric medium outside the metasurface, to an internal focal plane that is actually inside the metasurface (and by the same token, image this internal focal plane to the external focal plane). An imaging device, which may comprise an image sensor or an image generator, is fixed to the metasurface at the internal focal plane. The metasurface thus has only a single interface to an external dielectric medium. The inventors have found that in this configuration, the external and internal focal planes are perfectly imaged to one another, even in the presence of loss within the metasurface. The single-interface metasurface, in other words, acts as an all-pass spatial filter rather than a low-pass filter.

On the basis of this principle of operation, some embodiments of the present invention provide imaging apparatus comprising an image sensor, which is configured to capture an image of radiation that is incident on the front surface of the image sensor. A metasurface having negative permittivity and negative permeability at a selected target wavelength is fixed to the front surface of the array. In these embodiments, the image sensor is placed at the location of the internal focal plane of the metasurface and thus receives a perfect image of an object that is located at the external focal plane, without any other element between the external focal plane and the metasurface. The resolution of the apparatus is limited only by the image sensor, rather than by the optics. This sort of apparatus can thus serve as a near-field microscope with superior resolution to any optical microscope that is known in the art, without the need to scan the sample.

The detection layer of the image sensor affects the resolution in a number of ways, not only in terms of the pitch of the array of sensor elements (which is assumed to be substantially smaller than the target wavelength), but also in the quality of light absorption by each sensor element. To obtain a perfect image, the sensor elements should act as perfect absorbers with no reflection. In other words, the detection layer of the sensor array should approximate a Perfectly-Matched Layer (PML), as are known in the field of electromagnetic radiation. Furthermore, the perfect image is formed in steady-state, i.e., at the stationary limit, so that longer exposure time will generally result in improved resolution.

Other embodiments provide imaging apparatus comprising an image generator, which generates patterned radiation at a certain target wavelength at its front surface. A metasurface having a negative permittivity and a negative permeability at the target wavelength is fixed to the front surface of the image generator. In this case, the image generator is placed at the internal focal plane of the metasurface, which projects a perfect image of the patterned radiation onto the external focal plane, again without any other element between the metasurface and the external focal plane. This sort of apparatus can be used, for example, to perform optical lithography and other photoreproduction processes, with resolution superior to existing, diffraction-limited systems.

By virtue of using metasurfaces, rather than bulk metamaterials, embodiments of the present invention are advantageous not only in imaging performance, but also in terms of ease and cost of production. As noted earlier, the thickness of a metasurface is less than the target wavelength of the radiation that the metasurface is designed to focus, and may be less than one-quarter wave at the target wavelength, or even less than one-tenth wave. Since negative-index media do not exist naturally, they are artificially constructed by designing and fabricating an array of unit cells (typically metallic) that are smaller than the intended wavelength of operation. Production of bulk media (as in a slab lens) typically requires fabricating layer over layer to gain thickness. In the disclosed embodiments, however, the metasurface can be very thin and need not comprise more than a single layer or possibly a few layers of unit cells. The metasurface may be deposited on the front surface of the imaging device using methods of thin-film microfabrication that are known in the art.

Image Capture Devices

FIG. 1 is a schematic side view of an imaging system 20, in accordance with an embodiment of the present invention. A near-field imaging device 26 captures an image of the surface of a sample 22, which may be, for example, a patterned semiconductor wafer, a biological sample, or substantially any other sort of material that is relatively flat. System 20 is capable of direct, non-destructive optical imaging with a level of resolution that has in the past been generally available primarily by destructive techniques, such as scanning electron microscopy. The present system and methods may thus be used advantageously, inter alia, in applications such as imaging semiconductor wafers in production and imaging even living biological samples in real time.

A motion assembly 24 adjusts the position of the focal plane of device 26 on sample 22. Typically, motion assembly 24 performs this adjustment by changing the location of sample 22 relative to imaging device, generally including both transverse (X-Y) and lateral (Z) adjustments, and possibly angular adjustments (azimuth and/or tilt), as well. In the pictured example, motion assembly 24 comprises a stage on which sample 22 is mounted, which may comprise a piezoelectric drive in order to achieve sufficiently precise control (in the nanometer range), particularly in the Z-direction. Additionally or alternatively, the motion assembly may adjust the location of imaging device 26.

Imaging device 26 comprises an image sensor 30, having a metasurface 28 fixed to its front surface, i.e., to the light-sensitive surface that faces toward the sample. As explained above, metasurface 28 has a negative permittivity and a negative permeability at the target wavelength that is chosen for operation of system 20. (These are effective parameters, which are valid up to the granularity of the structure of the metasurface.) More specifically, metasurface 28 is typically designed to have a refractive index at the target wavelength that is the inverse of the refractive index of the dielectric medium between the front surface of the metasurface and sample 22. Assuming this medium to be air or vacuum, with refractive index n=1, metasurface 28 is then designed to have refractive index n=−1. On the other hand, for imaging biological surfaces, which may be immersed in an aqueous solution (n≅1.33), metasurface 28 may be designed to have n≈−1.33.

Figure 2:
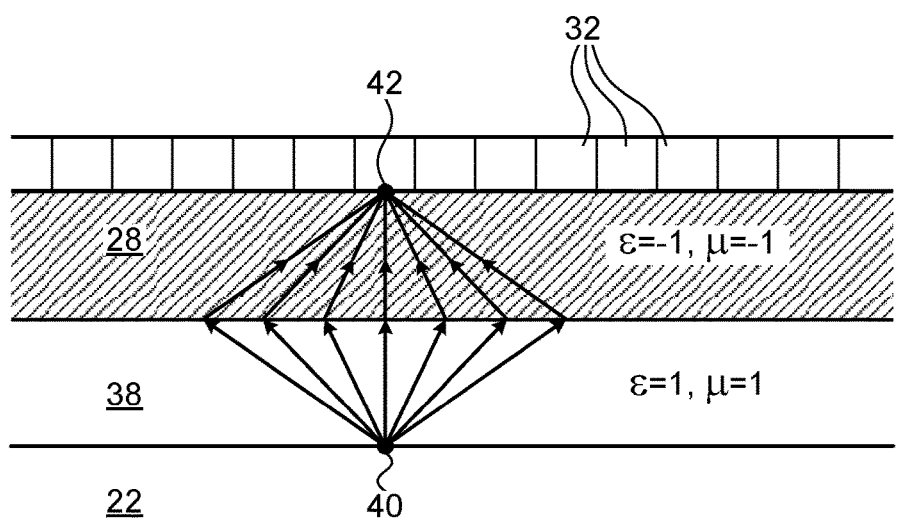
FIG. 2 is a schematic detail view of the imaging system of FIG. 1, showing details of the optical operation of the system, in accordance with an embodiment of the present invention.

FIG. 2 is a schematic detail view of system 20, showing details of optical operation of metasurface 28, in accordance with an embodiment of the present invention. In this example, the front surface of metasurface 28 is separated from sample 22 by a dielectric medium 38, which is assumed to be air or vacuum, with ε=1 and ν=1. Metasurface 28 comprises a DNG medium that is matched to dielectric medium 38, meaning that within the metasurface, ε=−1 and μ=−1 at the target wavelength. Consequently, all spatial Fourier components emitted from each object point 40 on sample 22 (i.e., all of the plane wave components, including the evanescent spectrum of non-homogenous exponentially-decaying plane waves) will be refracted back at the front surface of metasurface 28 precisely to a corresponding image point 42. The distance from object point 40 to the front surface of metasurface 28 is equal to the distance from the front surface to image point 42.

In practical applications, the optical radiation focused by metasurface 28 has a finite bandwidth, and the values of ε and μ may deviate slightly from the desired value of −1 even at the target wavelength. The inventors have found, however, that metasurface 28 is typically capable of focusing rays with full resolution over a bandwidth of at least ±2% relative to the target wavelength for which the metasurface is designed. Therefore, small deviations in the radiation wavelength and metasurface parameters will not significantly degrade the resolution of system 20.

Returning now to FIG. 1, image sensor 30 typically comprises an array of radiation-sensing elements 32, each of which outputs an electrical signal proportional to the intensity of radiation incident thereon, as is known in the art. For example, image sensor 30 may comprise a CMOS sensor array. The signals from image sensor 30 are output to an image processor 34, which drives a display 36 to present a magnified, real-time image of sample 22. The resolution of the image is limited only by the spatial resolution of the array of sensing elements 32.

Motion assembly 24 typically positions sample 22 so that the surface of the sample that is to be imaged is at a distance d from the front surface of metasurface 28, which is equal to the thickness d of the metasurface. The motion assembly may scan sample 22 in the Z-direction to enable images to be captured at multiple focal depths within the sample. Alternatively or additionally, device 26 may comprise a stack of two-dimension sensor arrays at different depths within metasurface 28, thus creating a three-dimensional sensor matrix. Each two-dimensional array captures an image of a plane at a different depth within sample 22, so that the sensor matrix is able to create a three-dimensional image of the sample in a single snapshot.

Alternatively, device 26 may comprise any other suitable type of image sensor, such as special-purpose, high-resolution chemical and biological imagers, as are known in the art.

Figure 3A:
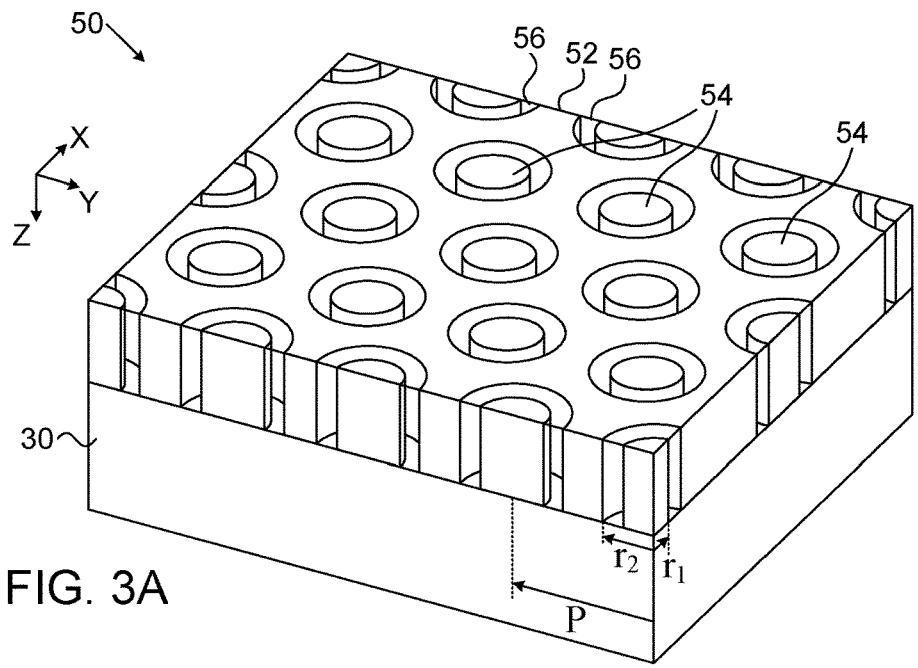
FIGS. 3A and 3B are schematic, pictorial illustrations of metasurfaces used in imaging devices in accordance with embodiments of the present invention.

FIG. 3A is a schematic, pictorial illustration of a metasurface 50 fixed to image sensor 30, in accordance with an embodiment of the present invention. Metasurface 50 is a specific, non-limiting example of the type of metamaterial that may be used to implement metasurface 28 in device 26 (FIG. 1). The type of metamaterial that is shown in FIG. 3A is described in the article cited above by Burgos et al. Metasurface 50 comprises a slab 52 of silver (Ag), containing a hexagonal array of waveguides defined by gallium phosphide (GaP) annular channels 56, which contain silver cores 54. For operation at a target wavelength of about 475 nm, the pitch of the array P=165 nm, the inner radius of channels 56 $r_1$=37.5 nm, and the outer radius $r_2$=62.5 nm. Channels 56 may be formed in slab 52, for example, by ion-beam milling or by electron-beam lithography in combination with reactive ion etching. The channels are then filled with GaP by molecular beam epitaxy or chemical vapor deposition.

Figure 3B:
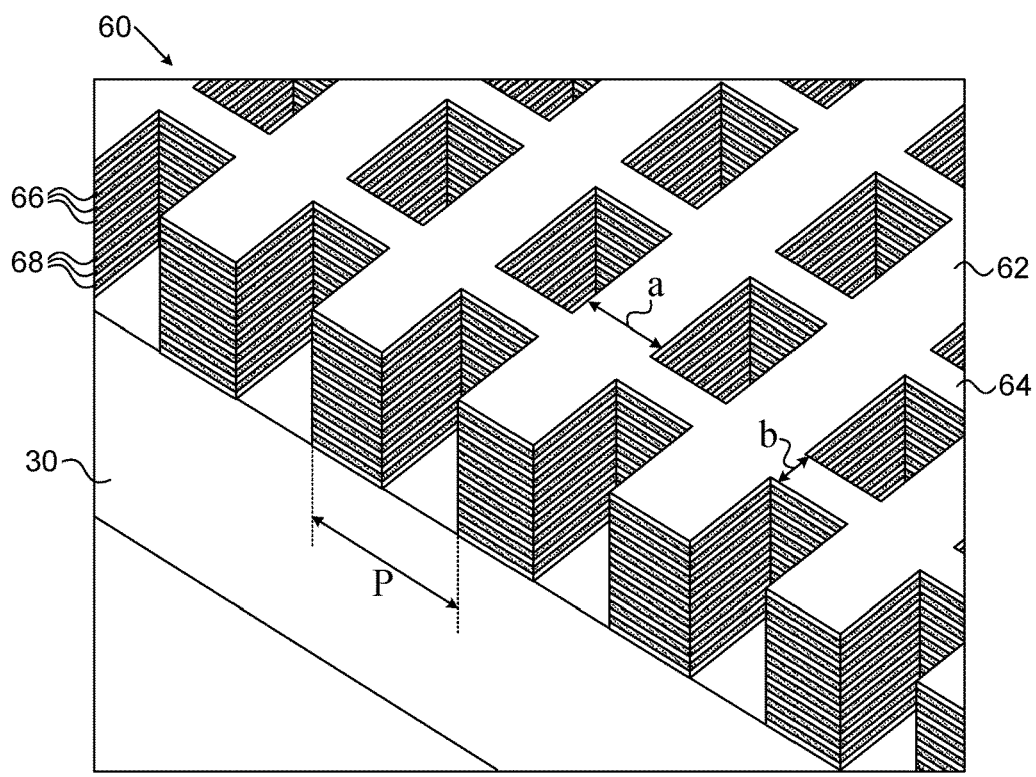

FIG. 3B is a schematic, pictorial illustration of a metasurface 60 fixed to image sensor 30, in accordance with another embodiment of the present invention. Metasurface 60, which is described in the article cited above by Valentine et al., is another example of the type of metamaterial that may be used to implement metasurface 28 in device 26 (FIG. 1). Metasurface 60 comprises a "fishnet" structure created in a stack of alternating of Ag layers 66 and MgF$_2$ layers 68. For operation at a target wavelength in the range of 1700 nm, in the near infrared, metasurface 60 comprises twenty-one layers 66 and 68, with respective thicknesses of 30 nm and 50 nm each. The pitch of the fishnet P=860 nm, while the arms of the fishnet mesh have respective widths a=565 nm and b=265 nm, as illustrated in the figure. Metasurface 60 may be fabricated, for example, by first creating the layered Ag/MgF$_2$ substrate by thin film deposition processes that are known in the art, and then focused ion-beam milling of the fishnet pattern.

The publications cited above provide further details as to techniques that may be used to design and produce such metamaterials at any suitable target wavelength, as well as techniques for evaluating and verifying the optical properties of the metamaterials. The above metamaterials are described by way of example, and any other metamaterials with suitable DNG properties may alternatively be used.

Figure 4:
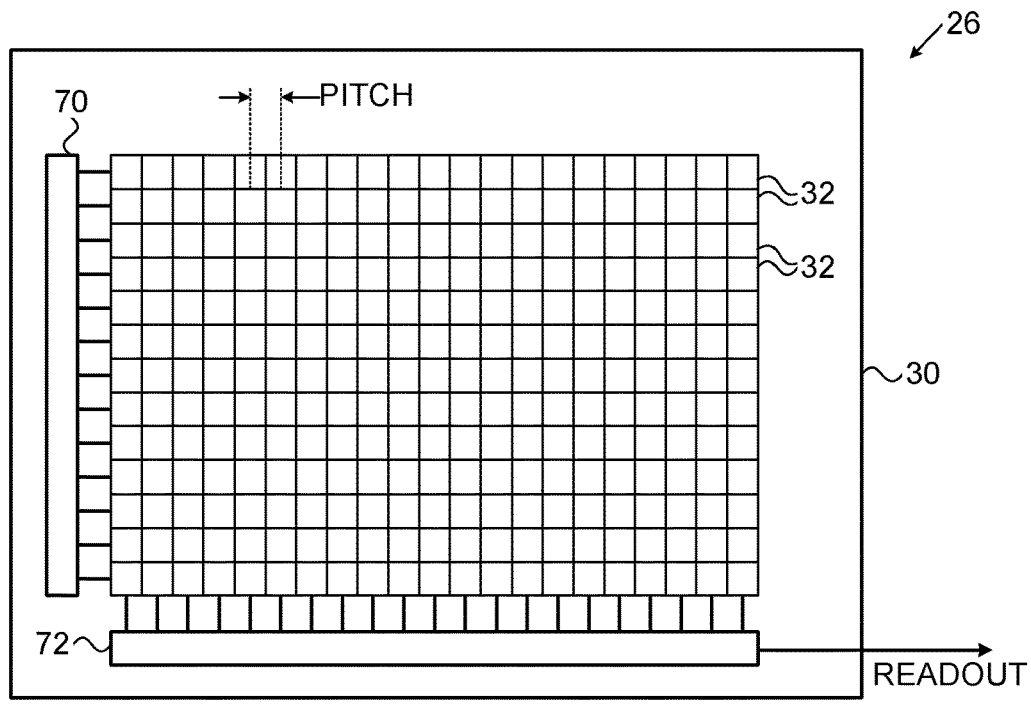
FIG. 4 is a schematic, frontal view of an image sensor for use in the system of FIG. 1, in accordance with an embodiment of the present invention.

FIG. 4 is a schematic, frontal view of image sensor 30, for use in imaging device 26 in accordance with an embodiment of the present invention. As noted above, image sensor 30 comprises an array of sensing elements 32, which are read out by addressing and readout circuits 70, 72. The array of sensing elements 32 and circuits 70 and 72, as well as metasurface 28 overlying image sensor 30, may be formed as successive layers on the same semiconductor substrate by a microfabrication process. Since metasurface 28 has effectively unlimited resolution, the resolution of device 26 is limited by the pitch of the array of sensing elements 32.

Because the resolution of existing imaging devices is generally bounded by the diffraction limit, the pitch of commercially-available sensing arrays is typically no finer than about 500 nm. It is possible using current CMOS technology, however, to produce image sensors having a pitch below 100 nm. Thus, using available technologies to produce metasurface 28 and image sensor 30, imaging device 26 can achieve resolution, in visible light, below 50 nm. As semiconductor manufacturing technology progresses further, it should become possible to produce image sensors with pitch in the 10-20 nm range, meaning that imaging device 26 will have resolution in this range, as well—much finer than any existing non-scanning method of optical imaging.

Image Projection Devices

Figure 5:
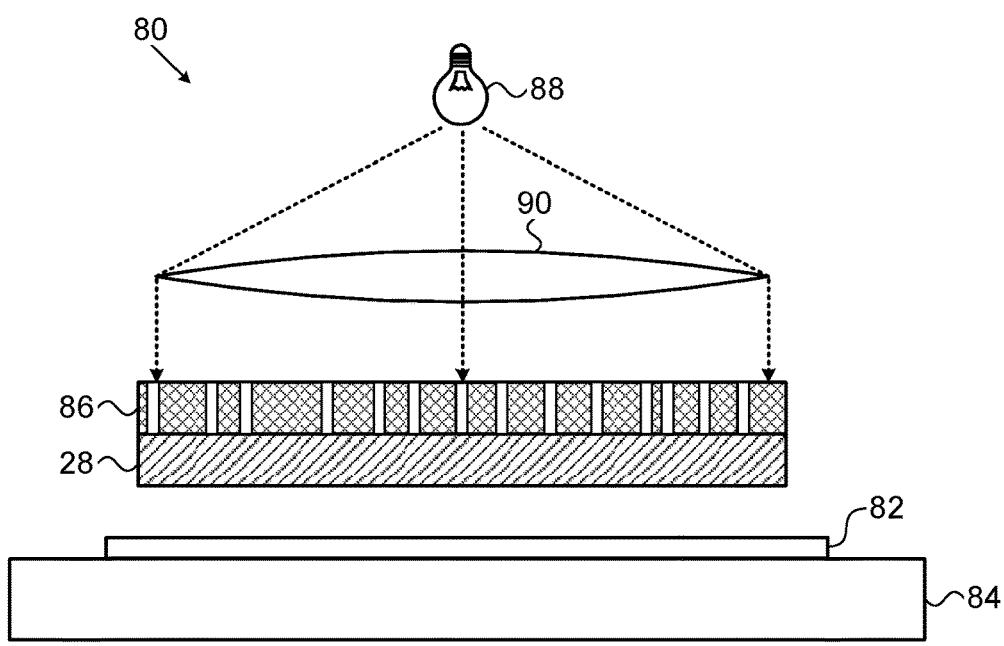
FIG. 5 is a schematic side view of an imaging system, in accordance with another embodiment of the present invention.

FIG. 5 is a schematic side view of an imaging system 80, in accordance with another embodiment of the present invention. System 80 is designed to project a pattern onto a substrate 82, which is mounted on a motion assembly 84 for this purpose (which may be similar to motion assembly 24 in FIG. 1). For example, substrate 82 may be a semiconductor wafer coated with a photoresist, which is exposed to radiation projected by system 80 in order to transfer the pattern onto the wafer by photolithography.

In the pictured embodiment, system 80 comprises an image generator in the form of a mask 86, which contains the pattern that is to be transferred to the substrate. Metasurface 28 is fixed to the front surface of mask 86. The mask is back-illuminated by a radiation source 88 with conventional condensing optics 90. Metasurface 28 projects a precise image of the back-illuminated pattern appearing at the front surface of mask 86 onto the surface of substrate 82. As in the preceding embodiments, metasurface 28 is designed to have $\varepsilon=-1$ and $\mu=-1$ at the wavelength of radiation source 88, and thus the distance from the front surface of metasurface 28 to the surface of substrate 82 is equal to the thickness of metasurface 28.

Metasurface 28, which may be designed and produced as shown above in FIG. 3A or 3B, projects an exact, full-resolution replica of the pattern in mask 86 onto substrate 82. Diffraction effects are non-existent, and therefore the resolution of the projected pattern is limited only by the resolution of mask 86. Using methods of micro-machining that are known in the art, such as electron-beam or ion-beam milling, the pattern in the mask can be create with resolution as fine as a few nanometers. Thus, system 80 is capable of photolithographic pattern transfer with resolution finer than any currently-available system for optical (including ultraviolet) lithography.

In an alternative embodiment, the image generator may comprise an array of small radiation emitters, such as light-emitting diodes, having a form similar to the array of sensing elements shown in FIG. 4. In this case, circuits 70 and 72 are used to select the emitters that are to be activated in order to generate a desired pattern. Metasurface 28 is formed over the front surface of the emitter array and thus projects the pattern formed by the active emitters onto a substrate, such as substrate 82. In this case, the resolution of the projected image is limited by the pitch of the emitter array, which may not be as fine as the pitch of mask 86, but can still reach 10 nm or less. This embodiment has the advantage that patterns can be created flexibly, on demand, without requiring a dedicated mask for each desired pattern.

Whereas the embodiments described above refer specifically to the use of metasurfaces in imaging applications (in accordance with the definition of "metasurfaces" that is given above), the principles of the present invention may similarly be applied, mutatis mutandis, in producing imaging devices using suitable bulk DNG metamaterials, to the extent that such materials are available. In other words, the metasurfaces in the embodiments described above may be replaced by thicker metamaterials, and the image sensor or image generator may be fixed at the internal focal plane of the metamaterial, either within the bulk of the metamaterial (possibly including multiple image sensors at different depths, as described above) or at the rear surface of the metamaterial, depending on materials and system design. Although such embodiments may be more difficult to implement using current technology, they are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. Imaging apparatus, comprising:
   an image sensor, configured to capture an image of radiation at a target wavelength that is incident on a front surface of the image sensor; and
   a metasurface comprising a two-dimensional pattern of repeating structures, having a pitch and thickness that are less than the target wavelength of the radiation, directly fixed to the front surface of the image sensor and having a negative permittivity and a negative permeability at the target wavelength.

2. The apparatus according to claim 1, wherein the image sensor comprises an array of sensing elements.

3. The apparatus according to claim 2, wherein the image sensor comprises a substrate, and wherein the array of sensing elements and the metasurface are formed as successive layers on the substrate by a microfabrication process.

4. The apparatus according to claim 1, wherein the metasurface has a given thickness and is configured to form on the image sensor an image of an external focal plane at a distance from the metasurface that is equal to the thickness.

5. The apparatus according to claim 4, wherein the image sensor is configured to capture the image of a sample at the external focal plane, and wherein the apparatus comprises a motion assembly, which is configured to adjust a position of the focal plane on the sample.

6. The apparatus according to claim 1, wherein the metasurface is configured to form on the image sensor an image of an external focal plane without any other element between the external focal plane and the metasurface.

7. The apparatus according to claim 6, wherein the metasurface is configured to form the image with a resolution that is finer than the diffraction limit at the target wavelength.

8. Imaging apparatus, comprising:
an image generator, which has a front surface and is configured to generate patterned radiation at a target wavelength at the front surface; and
a metasurface comprising a two-dimensional pattern of repeating structures, having a pitch and thickness that are less than the target wavelength of the radiation, directly fixed to the front surface of the image generator and having a negative permittivity and a negative permeability at the target wavelength.

9. The apparatus according to claim 8, wherein the image generator comprises an array of radiation emitters.

10. The apparatus according to claim 8, wherein the image generator comprises a mask in which a pattern is formed, and a radiation source configured to back-illuminate the pattern.

11. The apparatus according to claim 8, wherein the metasurface has a given thickness and is configured to form an image of the patterned radiation at an external focal plane at a distance from the metasurface that is equal to the thickness.

12. The apparatus according to claim 11, and comprising a motion assembly, which is configured to adjust a position of the focal plane on a substrate so that the patterned radiation writes a pattern on the substrate.

13. The apparatus according to claim 8, wherein the metasurface is configured to form an image of the patterned radiation on a substrate at an external focal plane without any other element between the metasurface and the substrate.

14. The apparatus according to claim 13, wherein the metasurface is configured to form the image with a resolution that is finer than the diffraction limit at the target wavelength.

15. A method for imaging, comprising:
fixing a metasurface, comprising a two-dimensional pattern of repeating structures, having a pitch and thickness that are less than the target wavelength of the radiation and having a negative permittivity and a negative permeability at a target wavelength, directly to a front surface of an image sensor; and
using the metasurface, focusing radiation at the target wavelength from an object onto the image sensor so as to capture an image of the object.

16. The method according to claim 15, wherein the image sensor comprises an array of sensing elements.

17. The method according to claim 16, wherein fixing the metasurface comprises forming the array of sensing elements and the metasurface as successive layers on a substrate by a microfabrication process.

18. The method according to claim 15, wherein the metasurface has a given thickness, and wherein focusing the radiation comprises forming the image of an external focal plane located at a distance from the metasurface that is equal to the thickness.

19. The method according to claim 18, wherein forming the image comprises forming images at multiple focal depths within the sample.

20. The method according to claim 15, wherein focusing the radiation comprises forming the image on the image sensor using the metasurface without any other element between the object and the metasurface.

21. The method according to claim 20, wherein the image is formed with a resolution that is finer than the diffraction limit at the target wavelength.

22. The method according to claim 15, wherein the object comprises a patterned semiconductor wafer.

23. The method according to claim 15, wherein the object comprises a living biological sample.

24. A method for imaging, comprising:
fixing a metasurface, comprising a two-dimensional pattern of repeating structures, having a pitch and thickness that are less than the target wavelength of the radiation and having a negative permittivity and a negative permeability at a target wavelength, directly to a front surface of an image generator; and
using the metasurface, focusing patterned radiation at the target wavelength from the image generator onto an object.

25. The method according to claim 24, wherein the image generator comprises an array of radiation emitters.

26. The method according to claim 24, wherein the image generator comprises a mask in which a pattern is formed, and wherein focusing the patterned radiation comprises back-illuminating the pattern in order to create the patterned radiation.

27. The method according to claim 24, wherein the metasurface has a given thickness, and wherein focusing the patterned radiation comprises forming an image of the patterned radiation at an external focal plane at a distance from the metasurface that is equal to the thickness.

28. The method according to claim 24, wherein focusing the patterned radiation comprises forming an image of the patterned radiation on the object using the metasurface without any other element between the metasurface and the object.

29. The method according to claim 28, wherein the image is formed with a resolution that is finer than the diffraction limit at the target wavelength.

30. The method according to claim 24, wherein focusing the patterned radiation comprises writing a pattern on the object using the patterned radiation.

31. The method according to claim 30, wherein the object comprises a semiconductor substrate, and wherein writing the pattern comprises forming the pattern on the semiconductor substrate by photolithography.

* * * * *